United States Patent [19]

Wing et al.

[11] Patent Number: 4,640,520
[45] Date of Patent: Feb. 3, 1987

[54] BRAKE DEVICE

[76] Inventors: Anders Wing, Hagaberg, Grimared, 439 29 Veddige; Christer Nicklasson, Skanegatan 116, 432 00 Varberg, both of Sweden

[21] Appl. No.: 698,483
[22] Filed: Feb. 5, 1985
[30] Foreign Application Priority Data Feb. 13, 1984 [SE] Sweden ............................ 8400741

[51] Int. Cl.$^4$ .............................................. B62B 1/18
[52] U.S. Cl. .................... 280/47.31; 188/2 D; 188/72.9
[58] Field of Search ............ 188/2 D, 24.12, 72.9, 188/72.6, 72.7, 72.8; 280/653, 47.31, 47.3

[56] References Cited

U.S. PATENT DOCUMENTS 2,716,031 8/1955 Roessler ..................... 280/47.31
3,950,005 4/1976 Patterson .................... 280/47.31
4,479,658 10/1984 Michaux ..................... 188/2 D X

FOREIGN PATENT DOCUMENTS 885423 9/1943 France ..................... 188/24.12

Primary Examiner—John J. Love
Assistant Examiner—Michael Mar
Attorney, Agent, or Firm—Beveridge, DeGrandi and Weilacher

[57] ABSTRACT

A brake device for single and/or multi-wheeled carts, so-called wheelbarrows, in which one arm (16, 17) is mounted on one or each shaft (1, 2) of the wheelbarrow, the one end of the arm (16, 17) being provided with a brake shoe (21, 22) directed towards the wheel (3) of the wheelbarrow, and the arm (16, 17) being pivotal towards and away from the wheel (3) for application of the brake shoe (21, 22) against the wheel (3), preferably in the proximity of the periphery of the wheel.

5 Claims, 5 Drawing Figures

BRAKE DEVICE

TECHNICAL FIELD

The present invention relates to a device for the manoeuverable braking of at least one of the wheels in single and/or multi-wheeled carts, primarily wheelbarrows, in which the wheel or wheels are rotatably disposed at the ends of a pair of shafts which, at opposite ends, form, or are provided with handles for steering and handling the wheelbarrow.

BACKGROUND ART

For most people, the handling of a wheelbarrow is fraught with considerable difficulties which become particularly manifest when the wheelbarrow is heavily loaded. Naturally, these difficulties will be further exacerbated if the load is, moreover, bulky or consists of ready-mixed mortar or concrete. In addition, all such difficulties become further exacerbated on all load-carrying occasions when the wheelbarrow is to be run across an uneven surface and to be manoeuvered in tight spaces. The wheelbarrow quite often, as it were, "bolts" on downhill slopes and, in such an event, the person handling the wheelbarrow needs a great degree of skill and experience to cater for such a situation. It is, moreover difficult—without special tipping aids—to empty the wheelbarrow into, for example, a form or the like. The chief reason for these difficulties and problems resides in the fact that wheelbarrows lack a simple, efficient and easily-operable braking device.

OBJECT OF THE PRESENT INVENTION

The task forming the basis of the present invention is to satisfy the above-outlined needs.

SOLUTION

This task is solved according to the present invention by the device disclosed by way of introduction, in that there is disposed, at one or each shaft, an arm whose one end is fitted with a brake shoe directed towards the wheel and being pivotal towards and away from the wheel for abutment of the brake shoe against the wheel, preferably in the proximity of the periphery thereof. The arm consists of a lever which, at one position between the ends, is pivotally disposed on the shaft, with the end of the brake shoe at the periphery of the wheel. The lever is spring-loaded for pivoting the brake shoe away from the wheel. An operating mechanism is disposed between the lever and the handle section of the shaft for pivoting the brake shoe end of the lever towards the wheel, against the action of a spring. A lever is disposed on each one of the shafts and a draft spring is arranged between the ends of the levers facing away from the wheel. One end of a brake cable is fixed to the one lever, while the sleeve end of the brake cable is fixed in the other lever for pivoting the levers towards one another when the brake cable is pulled. The anchorage points of the brake cable are located on the same side of the fulcrums of the levers as the brake shoes.

ADVANTAGES

A device according to the present invention considerably facilitates the handling of a wheelbarrow. First, the wheelbarrow can be optionally braked on downhill slopes, thereby as good as completely eliminating the risks that the wheelbarrow will bolt. Furthermore, manoeuvering of a wheelbarrow around curves or at the junction of duckboards will be made much easier. Moreover, application of the brake makes for easier tipping of the wheelbarrow at the desired place without the need of any auxiliary aids whatever.

BRIEF DESCRIPTION OF THE ACCOMPANYING DRAWINGS

The nature of the present invention and its aspects will be more readily understood from the following brief description of the accompanying drawings, and discussion relating thereto.

DESCRIPTION OF PREFERRED EMBODIMENTS

Figure 1:
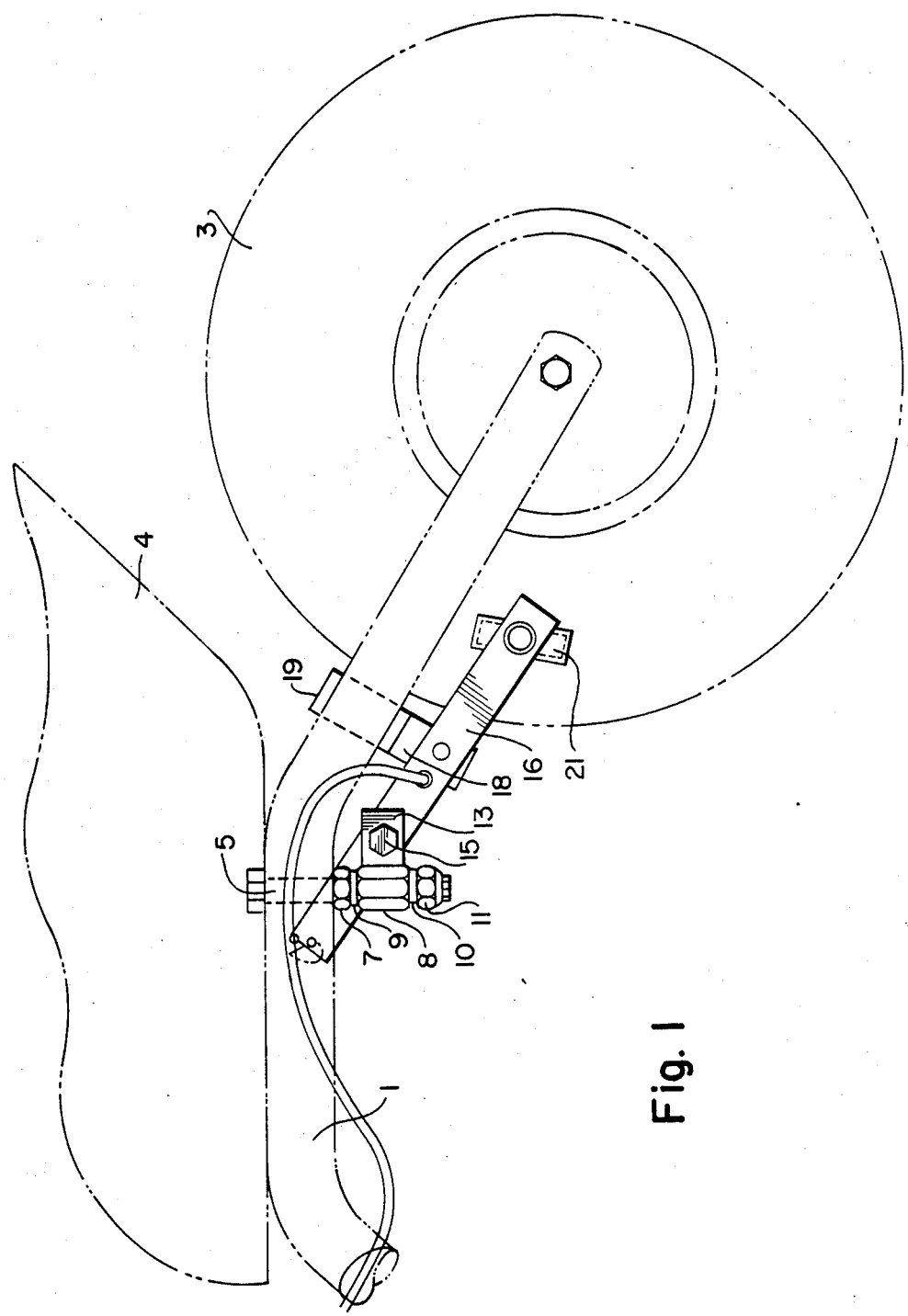
FIG. 1 is a side elevation of a device according to one embodiment of the present invention.
Figure 2:
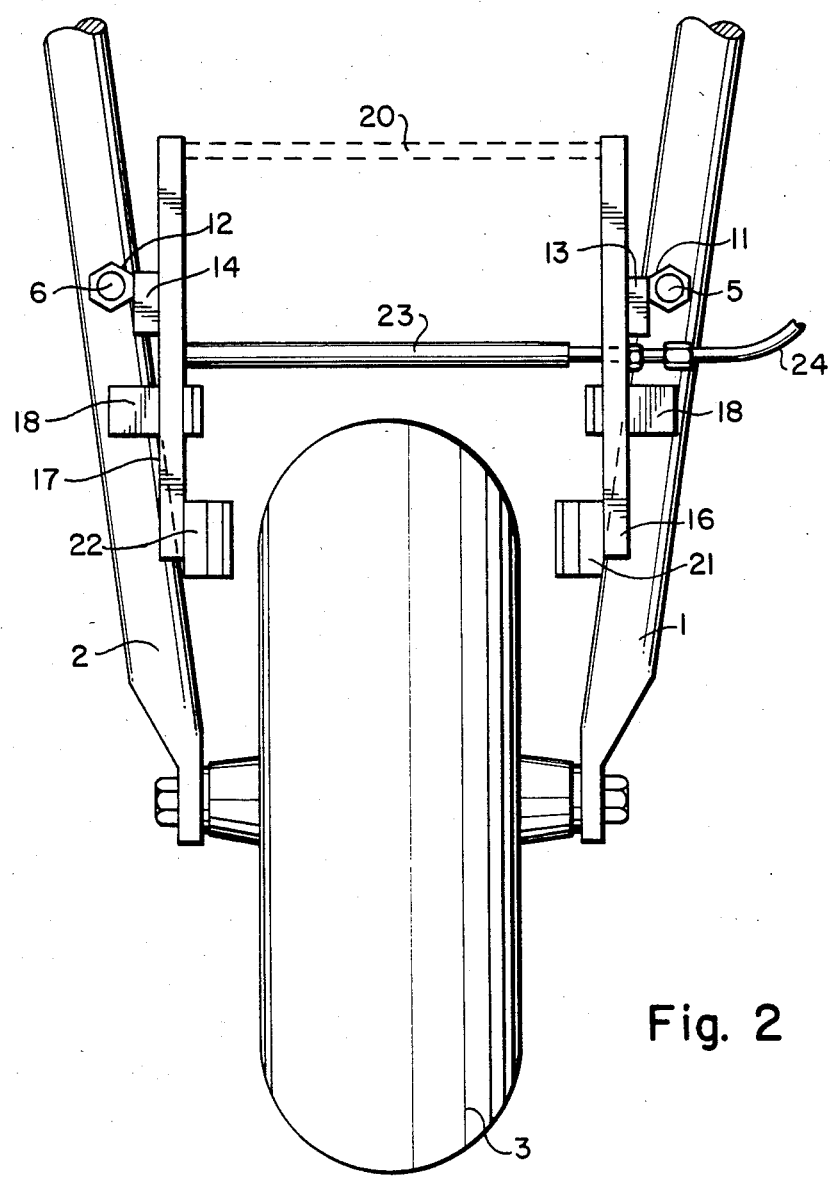
FIG. 2 is a view from beneath of the device of FIG. 1.
Figure 3:
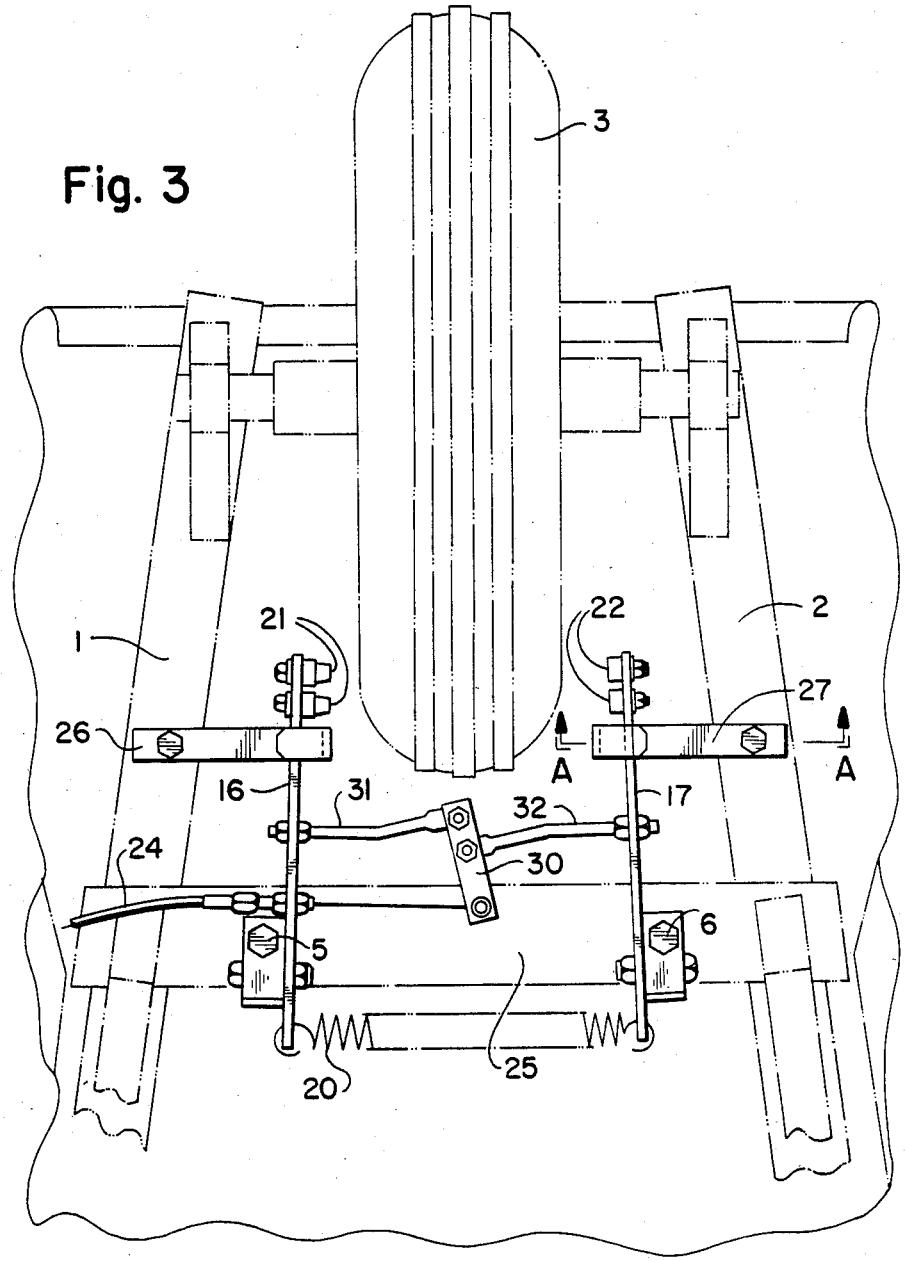
FIG. 3 is a view from beneath of a device according to another embodiment of the present invention.

The device according to the present invention is adaptable to any prior art wheelbarrow. The embodiment illustrated in FIGS. 1 and 2 is intended for one type of wheelbarrow, while the embodiment illustrated in FIG. 3 is intended for another type of wheelbarrow. Since the device according to the present invention is adaptable so as to be applied to all types of wheelbarrows, these will not be described in greater detail but only those parts which have a direct bearing on the appreciation of the device according to the present invention. In FIG. 1, the parts of a wheelbarrow are shown by means of ghosted lines, while the parts of a wheelbarrow in FIGS. 2 and 3 are shown by solid lines.

The wheelbarrow illustrated in FIGS. 1 and 2 has two tubular shafts 1 and 2 which may be bent in a suitable manner so as to form both a support for the wheelbarrow and manoeuvering handles, although these parts are not shown on the drawings. A suitable wheel 3 of per se known type used together with wheelbarrows is disposed between the front ends of the shafts 1 and 2. Furthermore, a load carrier or body 4 is mounted on the tubular shafts 1 and 2. A hole is drilled through the bottom of the body 4 and each one of the shafts 1 and 2 for bolts 5 and 6, respectively. The bolts 5 and 6 are positionally fixed by means of nuts 7. A bushing 8 is disposed on the free end of the bolts 5 and 6 and is arranged for free rotation on the bolts 5 and 6. on either side of the busing 8, there is disposed a washer 9, 10, so as to facilitate pivoting or rotation of the busing 8 on the bolts 5, 6. The busing 8 and the washers 9 and 10 are positionally fixed on the bolts 5, 6 by means of nuts 11 and 12, respectively. Thus, the busing 8 is pivotal or rotary between the washers 9 and 10, but is immobile in an axial direction.

A cross piece 13, 14, respectively is fixedly disposed on each one of the bushings 8. The cross pieces 13 and 14 may suitably be fixedly welded on their bushings 8. The cross pieces 13 and 14 have a throughhole for a bolt 15 which extends into a threaded hole in a lever 16, 17. As is more closely illustrated in FIG. 1, the levers 16, 17 extend essentially in parallel with that shaft section which extends from the body 4 to the axle of the wheel 3.

In order to prevent turning of the levers 16 and 17 during application of the brake, two mutually cooperating angle irons 18 and 19 are fixedly anchored on each one of the levers, the shanks of the angle irons being located on either side of the shaft 1. The angle irons 18 and 19 are preferably anchored to the levers 16 and 17 by means of a bolt which extends through the angle irons 18 and 19 into a threaded hole in the levers 16 and 17.

A draft spring 20 extends between those ends of the levers 16 and 17 most proximal the body 4 and, as is most clearly apparent from FIG. 2, will move the opposing ends of the levers away from the wheel 3 until the angle irons 19 come into abutment with the shafts 1 and 2. The opposing ends of the levers 16 and 17 in relation to the draft spring 20 each display a brake shoe 21 and 22. The brake shoes 21 and 22 are preferably fixedly retained on the lever ends 16 and 17 by means of some type of threaded screw so that the brake shoes 21 and 22 may be set in the desired position for the most suitable braking effect. The brake blocks or linings of the brake shoes 21 and 22 are suitably designed for their contemplated purpose.

For operating the levers 16, 17, there is provided a brake cable 23 which is disposed in a sleeve 24. One end of the sleeve 24 is anchored in the lever 16 and its position is fixed by means of a nut 25, while the brake cable 23 proper is anchored in the lever 17 in a per se known and appropriate manner. The opposing ends of the brake cable 23 and the sleeve 24 are fixedly retained in a per se known grip for operating a traction-type brake cable, the grip being placed at a suitable position in the proximity of the handle of the shaft 1, such that the grip may easily be actuated by the person manoeuvering the wheelbarrow. When the cable 23 is tensioned, the levers 16 and 17 will, clearly, be pivoted against the action of the spring 20 into braking abutment with the wheel 3, and as soon as the grip is released, the spring 20 will return the levers 16 and 17 to the position illustrated in FIG. 2. As a result of the cooperation between the angle irons 18 and 19 and the shafts 1 and 2, turning of the levers 16 and 17 in the rolling direction of the wheel 3 will be counteracted.

The various component parts of the brake device are mounted by means of screws, but, naturally, there is nothing to prevent these components from being mounted by any other means; but screws are to be preferred, since they make for after-adjustment and setting of the brake device.

Figure 4:
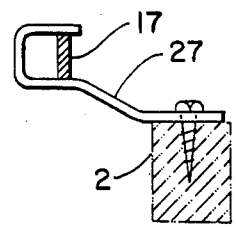
FIG. 4 is a section taken along the line A—A in FIG. 3.
Figure 5:
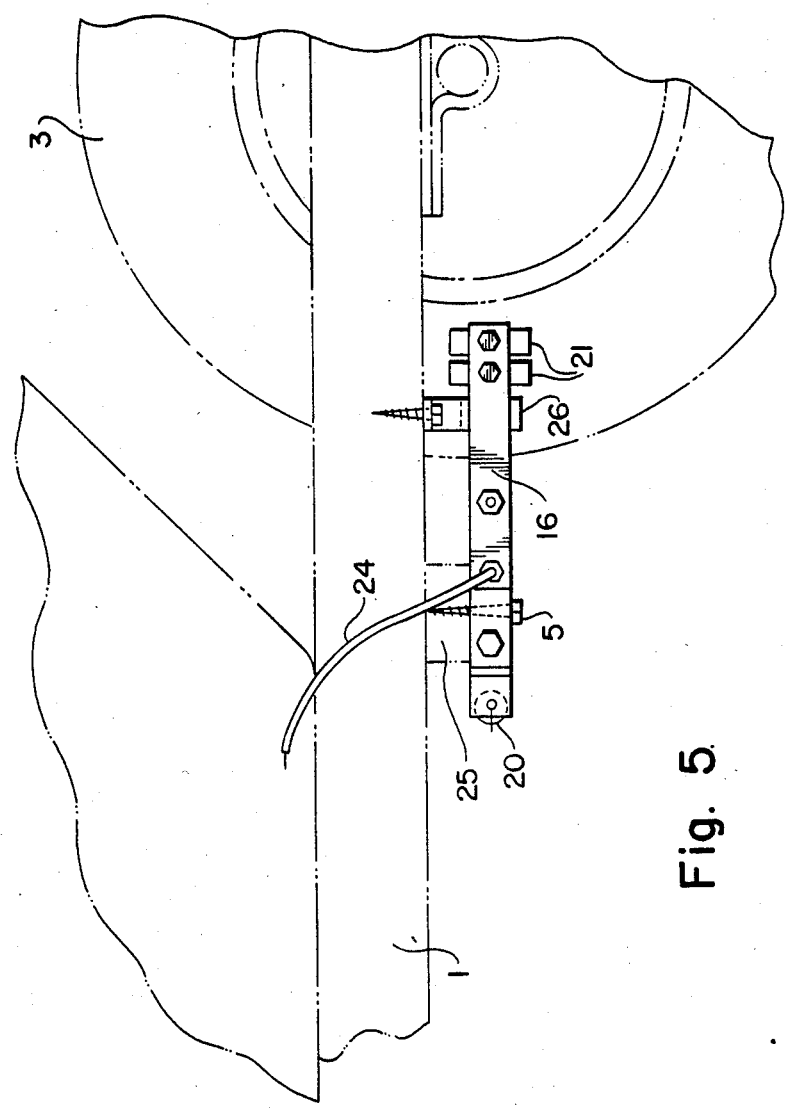
FIG. 5 is a side elevation of the device in FIG. 3.

The embodiment of the present invention illustrated in FIGS. 3–5 is intended for a wheelbarrow with wooden shafts 1 and 2. In this embodiment, the bolts 5 and 6 are disposed in a cross piece 25 extending between the shafts 1 and 2. To prevent turning of the levers 16 and 17, angle irons 26 and 27 are fixedly disposed on the shafts 1 and 2, the free ends of the angle irons are bent into a channel for the levers 16 and 17 (see FIG. 4).

The embodiment illustrated in FIG. 3 differs, moreover, from the embodiment illustrated in FIGS. 1 and 2 in that the levers 16 and 17 are manoeuvered by means of the cable 23 via a so-called booster which consists of an arm 30 in whose one end the end of the brake cable 23 is fixed, and in whose other end two arms 31 and 32 are pivotally disposed. The end of the arm 31 is anchored in the lever 16, while the end of the arm 32 is anchored in the lever 17. In FIG. 3, the sleeve 24 of the brake cable 23 has been omitted, but it is obvious that the end of the sleeve must be fixedly retained in the lever 16 in fundamentally the same manner as in the embodiment described in conjunction with FIGS. 1 and 2. The opposing ends of the brake cable and the sleeve 24 are fixedly disposed in a suitable grip on the one shaft, this grip being of per se known type. Each end of the levers 16 and 17 display brake shoes 21 and 22, respectively.

We claim:

1. A device for braking at least one wheel in a cart, for example a wheelbarrow, which has a frame including a pair of shafts, a wheel mounted between the shafts at one end thereof, said shafts having opposite ends provided with handle portions for maneuvering the cart, said braking device comprising two brake levers which extend along a said shaft, brake shoes mounted on said brake levers, connection means including first and second pivots for mounting each brake lever on the frame, said first pivot supporting its respective brake lever for pivotal movement about a first pivot axis to and from a braking position where the brake shoe engages the wheel, means for biasing each brake lever for movement away from said braking position, operating means for moving each brake lever about said first pivot axis to bring the brake shoe against the wheel, said second pivot mounting its respective brake lever for pivotal adjusting movement about a second pivot axis, said second pivot being oriented to provide an adjustment of the angle between the brake lever and the first pivot axis, said operating means including a brake cable, booster means with input and output connections connected respectively to the brake cable and said brake levers, said booster means being operable to provide forces at the output connections which are greater than the force exerted by said brake cable at the input connection, said booster means being a booster lever which has one end connected to the cable and another end with two pivots, and arms which connect said pivots to said brake levers.

2. A device according to claim 1 wherein said biasing means comprising a tension spring which is connected between said brake levers at their ends which are opposite from said brake shoes.

3. A device according to claim 1 wherein said brake cable has a wire which is housed in and extends from a sleeve, said wire being affixed to one brake lever, said sleeve being connected to the other brake lever so that the brake levers are moved toward and away from each other in response to movement of the wire in the sleeve.

4. A device according to claim 1 wherein the sleeve and wire are each connected to their respective arms at points which lie between a said brake shoe and a first pivot.

5. A device according to claim 1 having means located near the brake shoe for supporting the brake levers when the brake shoes engage the wheel.

* * * * *